T. EMERY.

Log-Turners.

No. 6,092. Reissued Oct. 20, 1874.

Witnesses:
J. H. Brown.
Leander H. Willett

Inventor:
Temple Emery.
By Dudley Warner.
his atty

THE GRAPHIC CO. PHOTO-LITH. 39 & 41 PARK PLACE, N.Y.

UNITED STATES PATENT OFFICE.

TEMPLE EMERY, OF PESHTIGO, WISCONSIN.

IMPROVEMENT IN LOG-TURNERS.

Specification forming part of Letters Patent No. 136,145, dated February 25, 1873; reissue No. 6,092, dated October 20, 1874; application filed July 24, 1873.

*To all whom it may concern:*

Be it known that I, TEMPLE EMERY, of Peshtigo, in the county of Oconto and State of Wisconsin, have invented a new, useful, and Improved Log-Roller, of which the following is a full, clear, and exact description, which will enable others skilled in the art to which my invention appertains to make and use the same, reference being had to the accompanying drawing forming a part of this specification, and in which—

Figure 1:
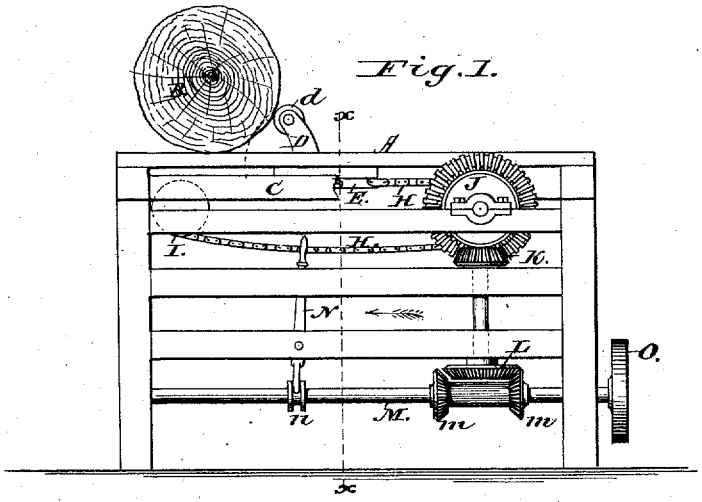
Figure 2:
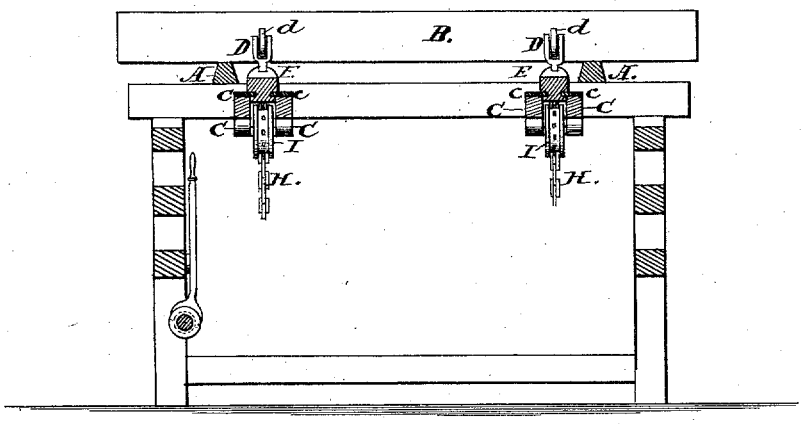
Figure 3:
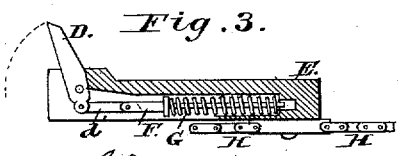
Figure 4:
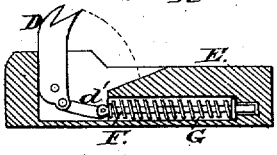

Figure 1 represents a side elevation of a machine or implement which embodies my invention; Fig. 2, a vertical cross-section of the same in the plane of the line *x x;* Fig. 3, a vertical central longitudinal section of one of the sliding blocks; and Fig. 4 represents a modification in the construction of the sliding blocks and the knee or dog attached thereto.

Like letters of reference indicate like parts.

The object of my invention is to provide means whereby logs and cants may be moved on skidways without the employment of manual labor, except as hereinafter stated; and to that end it consists of sliding, folding, self-adjustable knees or dogs operated by means of suitable mechanism, and arranged to engage the logs and cants, and roll and slide them on the skidway.

In the drawing, A A represents a skidway, and B is a log thereon. C C are ways arranged below the skidway. D D are knees or dogs arranged to ride on the ways C C, and engage the logs and cants on the way A A. The movement of the knees or dogs D D on the ways C C will roll the logs and slide the cants on the way A A.

I construct and operate these parts in the following manner: I make the ways C C of parallel beams arranged in pairs, and so that a considerable space will intervene between each pair, and a comparatively small space between the beams of each pair, as shown in Fig. 2. *c c* are rails projecting from the inner faces of each pair of beams, constituting the ways C C. E E are sliding blocks, in the sides of which a longitudinal groove is sunken, into which the rails *c c* project, as shown in Fig. 2. One end of the blocks E E is cut out, as shown in Fig. 3, and the knees or dogs D D are pivoted in the projections thus formed. *d'* is a link-block, one end of which is pivoted to the lower end of the knees or dogs D D; and F is a pin provided with a shoulder and pivoted to the other end of the block *d'*. The free end of the pin F is arranged to play in the blocks E E, and the latter are constructed to receive it. G is an open spiral spring arranged around the pin F, and one end of this spring rests against the shoulder of the pin, and the other against the block, as shown in Fig. 3. *d d* are friction-rollers set in the free end of the knees or dogs D D. H H are endless chains attached to the blocks E E. I I are rag-wheels, which support the forward end of the chains H H, and the rear end of the chains is supported in like manner. J is a beveled gear-wheel rigidly attached to the shaft which carries the rag-wheels which support one end of the chains H H. K is a beveled pinion engaging the wheel J, and L is a beveled friction-wheel rigidly attached to the shaft of the pinion K. M is a horizontal sliding shaft, and *m m* are beveled friction-pinions arranged thereon to alternately engage the wheel L. *n* is a clutch-block on the shaft M; and N is a pivoted lever engaging the block *n*. O is a driving-wheel.

For the purpose of sliding cants I substitute a knee or dog having a sharpened or notched free end or edge, as shown in Figs. 3 and 4; and the construction of the blocks E E, and the arrangement of the parts attached thereto, may be changed in the manner indicated in Fig. 4. The free ends of the knees or dogs are also constructed and arranged to strike the lower face of the cants.

All the parts are arranged upon a suitable supporting frame.

It will be observed from the foregoing description that the knees or dogs are rendered inoperative in one direction; they are also self-adjusting; their motion is readily reversed and stopped, and the driving power is readily controlled.

Having thus described my invention, what I claim as new, and desire to secure by Letters Patent, is—

1. In a log-rolling machine, one or more horizontally sliding and folding knees, arranged and braced for continued engagement in one direction with logs arranged upon a skidway, and for disengagement therewith by reason of their contact with the said logs while moving in the opposite direction, substantially as and for the purposes specified.

2. In a log-rolling machine, one or more horizontally-sliding, folding, and self-adjustable knees, arranged and braced for continued engagement in one direction with logs arranged upon a skidway, and for disengagement therewith by reason of their contact with the said logs while moving in the opposite direction, substantially as and for the purposes specified.

3. In a log-rolling machine, the sliding, folding, and self-adjustable knees D D, one or more, in combination with an endless chain, by means of which the said knees are actuated, substantially as and for the purposes specified.

4. In combination with a log-rolling machine, the beveled friction-wheel L, the sliding shaft M, provided with the beveled friction pinion *m m*, and the clutch *n*, and the pivoted lever N, substantially as and for the purposes specified.

TEMPLE EMERY.

Witnesses:
W. A. ELLIS,
J. F. KELSEY.